United States Patent
Kimura (10) Patent No.: US 11,482,046 B2
(45) Date of Patent: Oct. 25, 2022

(54) ACTION-ESTIMATING DEVICE

(71) Applicant: ASILLA, INC., Tokyo (JP)

(72) Inventor: Daisuke Kimura, Tokyo (JP)

(73) Assignee: ASILLA, INC., Tokyo (JP)

( * ) Notice: Subject to any disclaimer, the term of this patent is extended or adjusted under 35 U.S.C. 154(b) by 58 days.

(21) Appl. No.: 17/045,536

(22) PCT Filed: Apr. 9, 2019

(86) PCT No.: PCT/JP2019/015402
§ 371 (c)(1),
(2) Date: Oct. 6, 2020

(87) PCT Pub. No.: WO2019/198696
PCT Pub. Date: Oct. 17, 2019

(65) Prior Publication Data
US 2021/0158029 A1    May 27, 2021

(30) Foreign Application Priority Data

Apr. 11, 2018   (JP) .............................. JP2018-076045
Apr. 11, 2018   (JP) .............................. JP2018-076046

(51) Int. Cl.
*G06V 40/20*    (2022.01)
*G06T 7/50*     (2017.01)
(Continued)

(52) U.S. Cl.
CPC ................ *G06V 40/20* (2022.01); *G06T 7/50* (2017.01); *G06T 7/70* (2017.01); *G06V 20/40* (2022.01); *G06T 2207/10016* (2013.01)

(58) Field of Classification Search
CPC ........ G06V 40/20; G06V 20/40; G06V 10/34; G06T 7/50; G06T 7/70; G06T 2207/10016
See application file for complete search history.

(56) References Cited

U.S. PATENT DOCUMENTS 10,929,829 B1*   2/2021  Hazelwood .......... G06V 30/224
2010/0303303 A1* 12/2010  Shen ...................... G06V 40/20
                                                                    382/107
(Continued)

FOREIGN PATENT DOCUMENTS

JP     2016-99982     5/2016
JP     2016-170605    9/2016
JP     2017-102808    6/2017

OTHER PUBLICATIONS

Ahmad et al., ("A Depth Video Sensor-Based Life-Logging Human Activity Recognition System for Elderly Care in Smart Indoor Environments", Sensors 2014, 14, 11735-11759; doi:10.3390/s140711735 (Year: 2014).*

(Continued)

*Primary Examiner* — Amara Abdi
(74) *Attorney, Agent, or Firm* — Jeffrey S. Melcher; Melcher Patent Law PLLC (57) ABSTRACT

[Problem]
To provide an action-estimating device with which an action of a subject appearing in a plurality of time-series images can be precisely estimated.
[Solution]
In the action-estimating device 1, an estimating-side detecting unit 13 detects a plurality of articulations A appearing in each time-series image Y on the basis of a reference having been stored in an estimating-side identifier 11 and serving to identify the plurality of articulations A. An estimating-side measuring unit 14 measures the coordinates and the depths of the plurality of articulations A appearing in each of the time-series images Y. On the basis of displacement in the plurality of time-series images Y of the measured coordinate and depth of each of the articulations A, a specifying unit 15 specifies, from among the plurality of articulations A, an articulation group B which belongs to a given subject. An (Continued)

estimating unit 16 estimates an action of the given subject Z on the basis of displacement in the plurality of time-series images Y of the coordinate and the depth of the whole of the articulation group B.

10 Claims, 4 Drawing Sheets

(51) Int. Cl.
*G06T 7/70* (2017.01)
*G06V 20/40* (2022.01)

(56) References Cited

U.S. PATENT DOCUMENTS

| | | | |
|---|---|---|---|
| 2018/0293753 A1* | 10/2018 | Varadarajan | G06K 9/6224 |
| 2018/0338710 A1* | 11/2018 | Tas | H04N 5/33 |
| 2019/0046836 A1* | 2/2019 | Starkey | A63B 24/0075 |

OTHER PUBLICATIONS

International Search Report issued in PCT/JP2019/015402, dated Jun. 18, 2019, pp. 1-2.
Written Opinion issued in PCT/JP2019/015402, dated Jun. 18, 2019, pp. 1-3.

* cited by examiner

ACTION-ESTIMATING DEVICE

TECHNICAL FIELD OF THE INVENTION

The present invention relates to an action-estimating device for estimating an action of a subject appearing in a plurality of time-series images.

BACKGROUND OF THE INVENTION

Conventionally, a device which detects a posture of a human appearing in time-series data based on the articulation of the human appearing in time-series data, and recognizes an action of the human based on the change of the posture is known (for example, Patent Document 1).

PRIOR ART

Patent Document 1: Japanese Patent Application publication No. 2017-228100.

SUMMARY OF INVENTION

Problem to be Solved by the Invention

However, the above patent document 1 just discloses a general posture-detecting method. Therefore, more accurate posture detection and action recognition have been desired.

In view of the foregoing, it is an object of the invention to provide an action-estimating device for precisely estimating an action of a subject appearing in a plurality of time-series images.

Means for Solving the Problem

The present invention provides an action-estimating device including: an estimating-side obtaining unit configured to obtain a plurality of time-series images in which one or more subjects appear; an identifier configured to store a reference for identifying a plurality of articulations of a subject; an estimating-side detecting unit configured to detect a plurality of articulations appearing in each time-series image based on the reference for identifying a plurality of articulations; an estimating-side measuring unit configured to measure coordinates and depths of the plurality of articulations appearing in each time-series image; a specifying unit configured to specify an articulation group belonging to one subject among the plurality of articulations, based on displacement in the plurality of time-series images of the coordinate and the depth of each measured articulation; and an estimating unit configured to estimate an action of the one subject based on the displacement in the plurality of time-series images of the coordinate and the depth of the whole of the articulation group.

With this configuration, the action-estimation with high degree of precision, which is not available only by tracking the time-series displacement for each articulation individually, is realized, since the action of the subject is estimated based on the displacement in the plurality of time-series images of the coordinate and the depth of the whole of the articulation group. In addition, the load on the CPU can be significantly reduced, since it is not necessary to consider of the displacement of each articulation. Further, it does not need to attach a sensor to the subject side, or provide a specific expensive sensor to the action-estimating device just by preparing the action-estimating device, the learning device and the photographing unit. Therefore, it becomes possible to perform the action-estimating more simply and inexpensively. Further, by using the annotation technology, it becomes possible to produce a lot of training data from the same image. Therefore, it becomes possible to perform the action-estimating more inexpensively and precisely.

Further, it is preferable that the displacement of the coordinate and the depth of the whole of the articulation group includes displacement of the coordinate and the depth of a center of gravity of the articulation group.

With this configuration, it becomes possible to estimate the action accurately by using the coordinate and depth of the center of gravity closely related to the body movement.

Further, it is preferable that the action-estimating device further includes a predicting unit configured to predict an action of the one subject which follows the plurality of time-series images, based on the displacement of the coordinate and the depth of the whole of the articulation group.

With this configuration, if the subject wears a falling-prevention mechanism, it becomes possible to give a momentary instruction of falling-prevention operation to the mechanism.

Further, it is preferable that the identifier further stores reference on a basic posture of a subject, and the specifying unit estimates the number of subjects appearing in the time-series images, based on the reference of a basic posture, and determines the number of subjects appearing in the time-series images, based on both the estimated number of subjects and the number of articulation-kinds in the detected plurality of articulations.

With this configuration, it becomes possible to accurately determine the number of subjects appearing in the time-series image.

Further, it is preferable that the identifier further stores reference on motion ranges of a plurality of articulations and reference on a distance between articulations in a subject, when determining the number of subjects, the specifying unit categorizes the estimated number of subjects into a main subject or a sub subject other than the main subject, and links the sub subject to any one of the main subjects, based on the reference on motion ranges of a plurality of articulations and the reference on a distance between articulations, and when categorizing, the specifying unit categorizes the number of subjects same as the determined number of subjects into the main subject in decreasing order of the number of the detected articulations.

With this configuration, it becomes possible to more accurately determine the number of subjects appearing in the time-series image.

Further, it is preferable that the identifier further stores a reference on motion ranges of a plurality of articulations in a subject, when determining the number of subjects, the specifying unit categorizes the estimated number of subjects into a main subject or a sub subject other than the main subject, and links the sub subject to any one of the main subjects, based on the reference on motion ranges of a plurality of articulations, and, when categorizing, the specifying unit categorizes a subject which fall under the reference on a basic posture to the main posture.

With this configuration, it becomes possible to more accurately determine the number of subjects appearing in the time-series image.

Another aspect of the present invention provides an action-estimating program installed on a computer storing a reference for identifying a plurality of articulations of a subject, the program including: a step for obtaining a plurality of time-series images in which one or more subjects appear; a step for detecting a plurality of articulations appearing in each time-series image based on the reference for identifying a plurality of articulations; a step for measuring coordinates and depths of the plurality of articulations appearing in each time-series image; a step for specifying an articulation group belonging to one subject among the plurality of articulations, based on displacement in the plurality of time-series images of the coordinate and the depth of each measured articulation; and a step for estimating an action of the one subject based on the displacement in the plurality of time-series images of the coordinate and the depth of the whole of the articulation group.

Further, it is preferable that the displacement of the coordinate and the depth of the whole of the articulation group includes displacement of the coordinate and the depth of a center of gravity of the articulation group.

Further, it is preferable that the action-estimating program further includes a step for predicting an action of the one subject which follows the plurality of time-series images, based on the displacement of the coordinate and the depth of the whole of the articulation group.

Further, it is preferable that the computer further stores reference on a basic posture of a subject, and the specifying step estimates the number of subjects appearing in the time-series images, based on the reference of a basic posture, and determines the number of subjects appearing in the time-series images, based on both the estimated number of subjects and the number of articulation-kinds in the detected plurality of articulations.

Further, it is preferable that the computer further stores reference on motion ranges of a plurality of articulations and reference on a distance between articulations in a subject, when determining the number of subjects, the specifying step categorizes the estimated number of subjects into a main subject or a sub subject other than the main subject, and links the sub subject to any one of the main subjects, based on the reference on motion ranges of a plurality of articulations and the reference on a distance between articulations, and, when categorizing, the specifying step categorizes the number of subjects same as the determined number of subjects into the main subject in decreasing order of the number of the detected articulations.

Further, it is preferable that the computer further stores a reference on motion ranges of a plurality of articulations in a subject, when determining the number of subjects, the specifying step categorizes the estimated number of subjects into a main subject or a sub subject other than the main subject, and links the sub subject to any one of the main subjects, based on the reference on motion ranges of a plurality of articulations, and, when categorizing, the specifying step categorizes a subject which fall under the reference on a basic posture to the main posture.

Effects of the Invention

According to the action-estimating device of the present invention, it becomes possible to precisely estimate an action of a subject appearing in a plurality of time-series images.

PREFERRED EMBODIMENTS

An action-estimating device 1 according to a preferred embodiment of the present invention will be described below, while referring to FIGS. 1 to 7.

Figure 1:
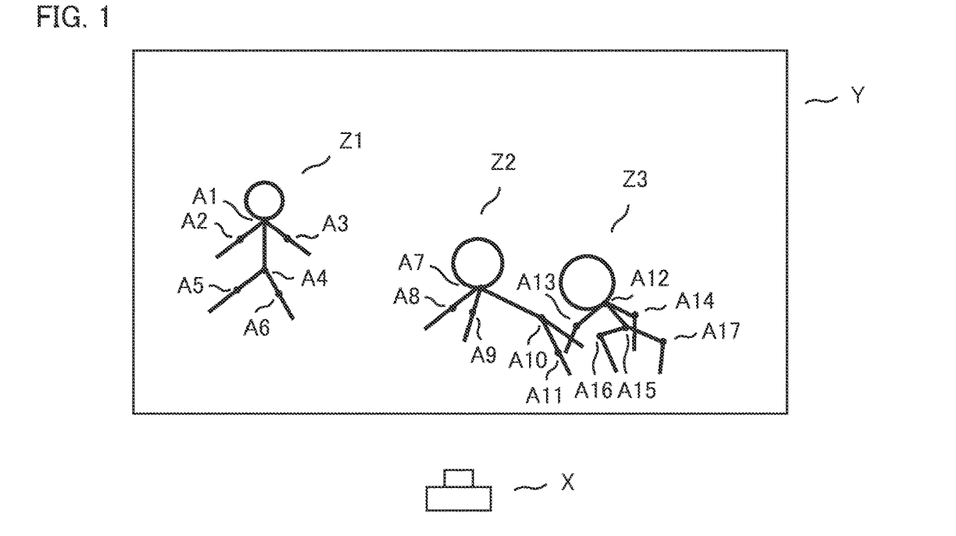
FIG. 1 is an explanatory view of a usage state of the action-estimating device according to an embodiment of the present invention.

As shown in FIG. 1, the action-estimating device 1 is used to estimate an action of one or plurality of subjects Z appearing in a plurality of time-series images Y (e.g., each frame constituting a video or the like) photographed by a photographing unit X (in this embodiment, for easy understanding, the subjects Z are displayed only on the skeleton). In action-estimating, information learned by a learning device 2 (see FIG. 2) is referred.

First, the configuration of the learning device 2 is described.

Figure 2:
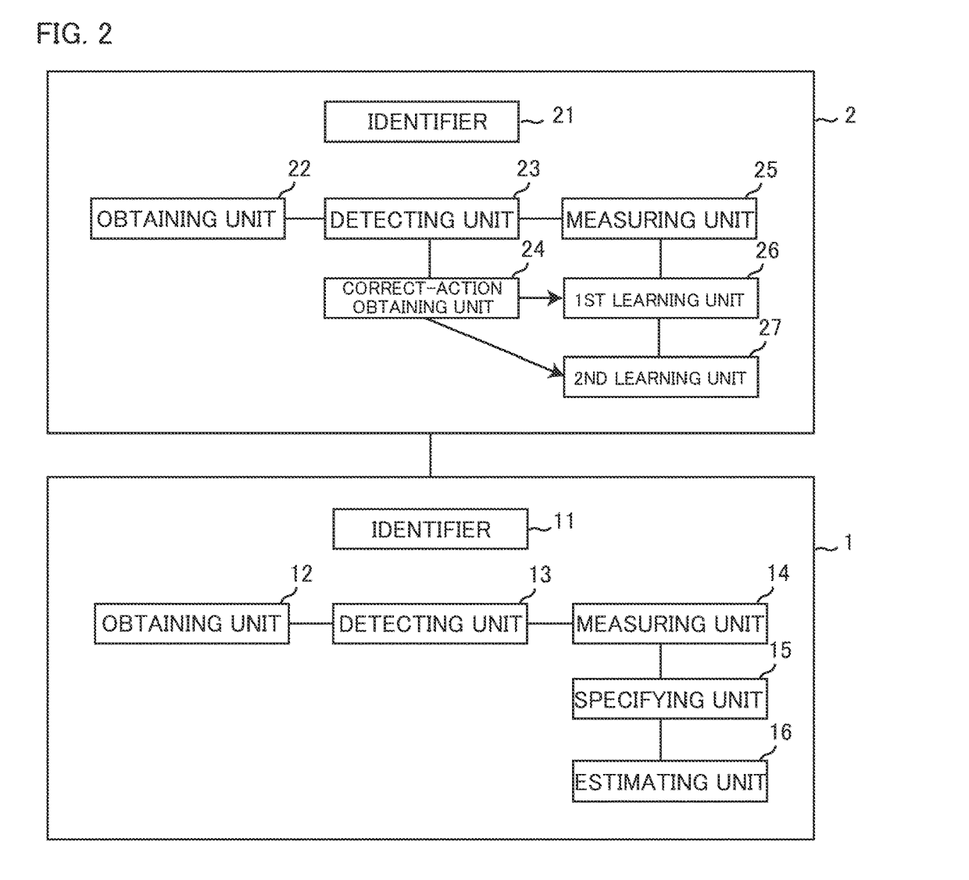
FIG. 2 is a block diagram of a learning device and the action-estimating device according to the embodiment of the present invention.

As shown in FIG. 2, the learning device 2 includes a learning-side identifier 21, a learning-side obtaining unit 22, a learning-side detecting unit 23, a correct-action obtaining unit 24, a learning-side measuring unit 25, a first learning unit 26, and a second learning unit 27.

The learning-side identifier 21 is used to identify a plurality of articulations A (in the present embodiment, neck, right elbow, left elbow, waist, right knee, and left knee) of a subject Z. The learning-side identifier 21 stores references, such as shape, direction, and size, for identifying each articulation A. The learning-side identifier 21 also stores references on various "basic posture" ("walking", "stand-up" etc.) of a subject Z, "motion range of each articulation A", and "distance between articulations A" in a single subject Z.

The learning-side obtaining unit 22 obtains video images (i.e. a plurality of time-series images Y), whose correct-action is known. The plurality of time-series images Y is inputted by the user of the action-estimating device 1.

The learning-side detecting unit 23 detects a plurality of articulations A appearing in each time-series image Y. Specifically, the learning-side detecting unit 23 detects the parts corresponding to the references stored in the learning-side identifier 21 using an inference model modeled by CNN (Convolution Neural Network). Each of the detected articulations A (A1 to A17 in FIG. 1) is selectably displayed on a display unit (not shown).

The correct-action obtaining unit 24 obtains a correct-action on each articulation A, which has been detected by the learning-side detecting unit 23, of the subject Z appearing in the plurality of time-series images Y. The correct-action is inputted by the user of the action-estimating device 1. In particular, when the plurality of time-series images Y in which a subject Z falls down is inputted in the learning-side obtaining unit 22, the user selects each articulation A on the display unit and inputs the correct-action "fall-down" in the correct-action obtaining unit 24.

In the present embodiment, when a plurality of subjects Z is displayed in the plurality of time-series images Y, the correct-action is inputted for each subject Z. In this case, after selecting articulations A included in one subject, the user inputs the correct-action for each selected articulation A. In the case of the subject Z1 of FIG. 1, after selecting the articulations A1 to A6, the user inputs the correct-action "walk" for each of the articulations A1 to A6. In the case of the subject Z2 shown in FIG. 1, after selecting the articulations A7 to A11, the user inputs the correct-action "fall-down." In the case of the subject Z3 shown in FIG. 1, after selecting the articulations A12 to A17, the user inputs the correct-action "squat." Further in the case of the subject Z3, the user also inputs the correct-action "lose balance" for each articulation A12 to A11 since the subject Z3 is not only squatting but also losing his balance.

The learning-side measuring unit 25 measures coordinates and depths of the plurality of articulations A detected by the learning-side detecting unit 23. This measurement is performed on each time-series image Y.

For example, the coordinate and the depth of the articulation A1 at the time t1 in the plurality of time-series images Y can be expressed such as XA1 (t1), YA1 (t1), ZA1 (t1). The depth is not necessarily expressed using the coordinate and may be expressed as relative depth in the plurality of time-series images Y. The depth may be measured by the known method. However, a depth of each articulation A, which has been inputted in advance in the correct-action obtaining unit 24, may also be used. The "measuring of depth by the learning-side measurement unit" of the present invention includes the case where the inputted depth is used. In this case, for example, the first learning unit 26 (described later) learns like "When the articulation has this size and angle, the articulation is in XX meters depth."

The first learning unit 26 learns the displacement in the plurality of time-series images Y of the coordinate and the depth of the whole of the plurality of articulations A belonging to each subject Z. Specifically, the first learning unit 26 specifies the plurality of articulations A belonging to each subject Z selected by the correct-action obtaining unit 24 as an articulation group B (see FIG. 3), and then, learns the displacement in the plurality of time-series images Y of the coordinate and the depth of the whole of the articulation group B.

It is considered to use, as the displacement of the coordinate and the depth of the whole of the articulation group B, the displacement of the coordinate and the depth of the center point of all the detected articulations A; or the displacement of the coordinate and the depth of the center of gravity closely related to the body movement. Both of these may also be used to increase the precision. The displacement of the coordinate and the depth of each articulation A may be taken into account to increase the precision. Note that the coordinate and depth of the center of gravity can be calculated based on the coordinate and the depth of each articulation A and the weight of each articulation A (including muscle, fat, etc.). In this case, information on the weight of each articulation A will be stored in the learning-side identifier 21 or the like in advance.

The second learning unit 27 learns the displacement in the plurality of time images Y of the coordinate and the depth of the whole of the articulation group B learned by the first learning unit 26, in connection with the correct-action inputted in the correct-action obtaining unit 24. For example, when the correct-action is "fall forward", the displacement of the coordinate of the whole of the articulation group B is learned as "move downward by first distance", and the displacement of the depth of the whole of the articulation group B is learned as "move forward by second distance."

Next, the configuration of the action-estimating device 1 will be described as below.

As shown in FIG. 2, the action-estimating device 1 includes an estimating-side identifier 11, an estimating-side obtaining unit 12, an estimating-side detecting unit 13, an estimating-side measuring unit 14, a specifying unit 15, and an estimating unit 16.

The estimating-side identifier 11 is used to identify a plurality of articulations A (elbow, shoulder, waist, knee, etc.) of a subject Z. The estimating-side identifier 11 stores references, such as shape, direction, and size, for identifying each articulation A. The estimating-side identifier 11 also stores references on various "basic posture" ("walking", "stand-up" etc.) of a subject Z, "motion range of each articulation A", and "distance between articulations A" in a single subject Z. In the present embodiment, the references same as the one stored in the learning-side identifier 21 are employed.

The estimating-side obtaining unit 12 is connected to the photographing unit X and obtains video images (i.e., a plurality of time-series images Y) taken by the photographing unit X. In the present embodiment, a plurality of time-series images Y is obtained in real-time. However, it may be obtained later depending on the intended purpose of the action-estimating device 1.

The estimating-side detecting unit 13 detects a plurality of articulations A appearing in each time-series image Y. Specifically, the estimating-side detecting unit 13 detects the parts corresponding to the references stored in the estimating-side identifier 11 using an inference model modeled by CNN (Convolution Neural Network). When the estimating-side detecting unit 13 detects an articulation A, it can be considered that one or more of subject Z is displayed in the time-series image Y.

The estimating-side measuring unit 14 measures coordinates and depths of the plurality of articulations A detected by the estimating-side detecting unit 13. This measurement is performed on each time-series image Y.

For example, the coordinate and the depth of an articulation A1 at the time t1 in the plurality of time-series images Y can be expressed such as XA1 (t1), YA1 (t1), ZA1 (t1). The depth is not necessarily expressed using the coordinate and may be expressed as relative depth in the plurality of time-series images Y. The depth may be measured by the known method. However, it is possible to specify the depth referring to the first learning unit 26 when the first learning unit 26 has already learned about the depth. The "measuring of depth by the estimating-side measurement unit" of the present invention also includes the case where the depth learned by the first learning unit 26 is used.

Figure 3:
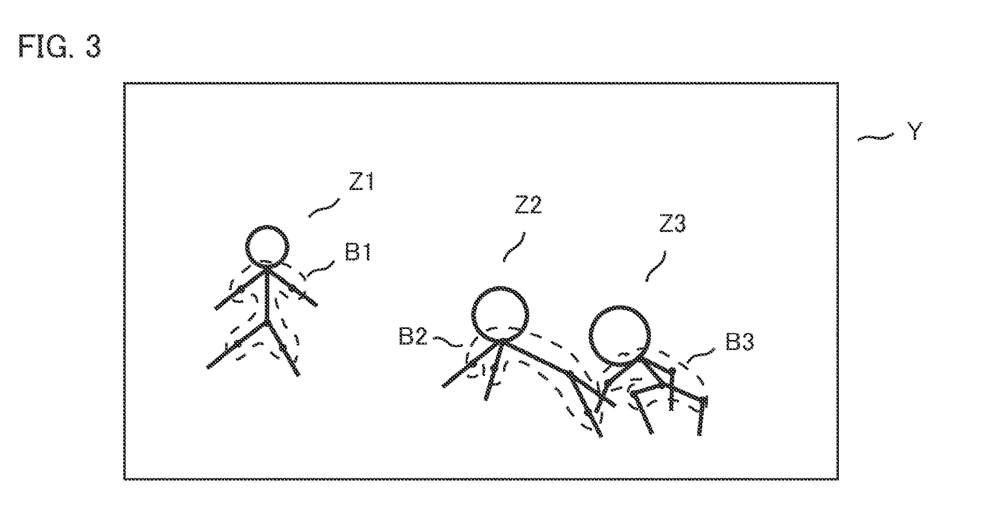
FIG. 3 is an explanatory view of an articulation group according to the embodiment of the present invention.

The specifying unit 15 specifies an articulation group B belonging to each subject Z from among the plurality of articulations A, while referring to the first learning unit 26, based on the displacement in plurality of time-series images Y of the coordinate and the depth of each articulation A measured by the estimating-side measuring unit 14. In FIG. 1 and FIG. 3, it is specified as follows; the articulations A1 to A6 are included in the articulation group B1 belonging to the subject Z1, the articulations A7 to A11 are included in the articulation group B2 belonging to the subject Z2, and the articulations A12 to A17 are included in the articulation group B3 belonging to the subject Z3.

In the present embodiment, before specifying a plurality of articulations A (articulation group B) belonging to each subject Z, the specifying unit 15 determines the number of subjects Z. Specifically, (1) estimating of the number of subjects Z is performed based on the reference on "basic posture" stored in the estimating-side identifier 11, and then (2) determining of the number of subjects Z is performed based on the number of articulation-kinds in the plurality of articulations A.

(1) Estimating of the Number of Subjects Z

In the estimating of the number of subjects Z, a plurality of articulations A which fall under the reference on "basic posture" stored in the estimating-side identifier 11 is estimated. In the example of FIG. 1, the articulations A1 to A17 are detected by the estimating-side detecting unit 13. Among them, the articulations A1 to A6 and articulations A7 to A11 are determined as articulations A which are included in the "basic posture." Therefore, it is estimated that two subjects Z are presented in the time-series image Y. On the other hand, the articulation A12 to A14 are determined as parts of the "basic posture." Therefore, it is estimated that one subject Z is presented in the time-series image Y.

On the other hand, the articulations A15 to A17, which are situated in irregular positions, are not determined as parts of the "basic posture", and are estimated that each of them is individual subject Z.

Figure 4:
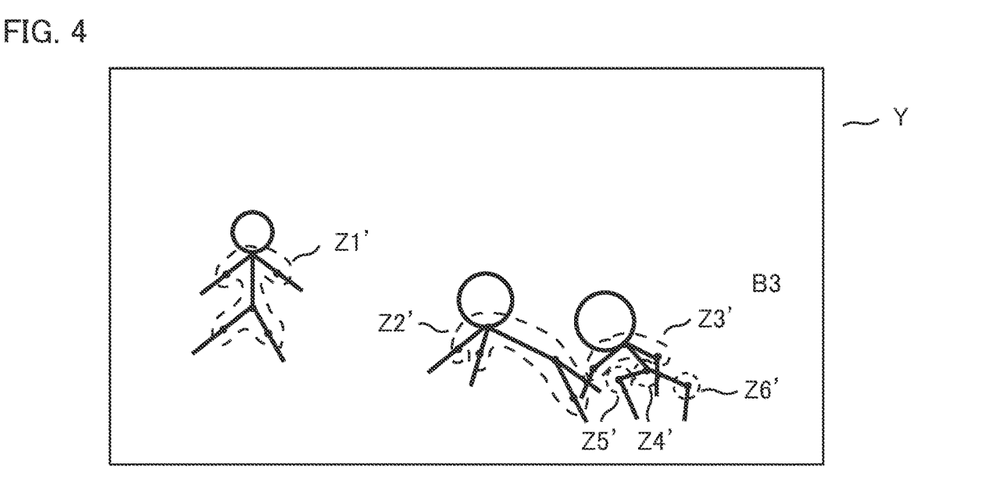
FIG. 4. is an explanatory view of a subject-number identification according to the embodiment of the present invention.

As the result, in this case as shown in FIG. 4, it is estimated that six targets Z1' to Z6' ("articulations A1 to A6", "articulations A7 to A11", "articulations A12 to A14", "articulation A15", "articulation A16" and "articulation A17") are presented in the time-series image Y.

(2) Determining of the Number of Subjects Z

Next, the determining of subjects Z is performed based on both the estimated number of subjects Z and the number of articulation-kinds in the plurality of articulations A.

For example, in FIG. 4, the subject Z1' includes six articulations A ("head", "right elbow", "left elbow", "waist", "right knee" and "left knee"); the subject Z2' includes five articulations A ("head", "right elbow", "left elbow", "waist" and "left knee"); the subject Z3' includes three articulations A ("head", "right elbow" and "left elbow"); the subject Z4' includes one articulation A ("waist"); the subject Z5' includes one articulation A ("right knee"); and the subject Z6' includes one articulation A ("left knee").

In this case, the articulations A "head", "right elbow", "left elbow", "waist" and "left knee", which are respectively presented three, are the largest articulation-kinds in number. Conclusively, it is determined that three subjects Z are presented in the time-series image Y.

(3) Specifying of a Plurality of Articulations a (Articulation Groups B) Belonging to Each Subject Z In specifying of a plurality of articulations A (articulation groups B) belonging to each subject Z, (A) Categorizing of the subject Z' into "main subject" or "sub subject"; and (B) Linking of the "sub subject" to the "main subject" are performed.

(A) Categorizing of the Subject Z' into "Main Subject" or "Sub Subject"

Here, the subjects Z1' to Z6' are categorized into "main subject" or "sub subject."

In the example shown in FIG. 4, it is determined in "(2) Determining of the number of subjects Z" that three subjects Z are presented. Therefore, in decreasing order of the number of the detected articulation A, the three subjects Z1', Z2', and Z3' are categorized into the "main subject", while other subject Z4', Z5' and Z6' are categorized into the "sub subject".

(B) Linking of "Sub Subject" to "Main Subject"

Next, it is determined whether or not the "sub subjects" Z4', Z5' and Z6' can be linked to any one of the "main subjects" Z1', Z2' and Z3, while referring to the references on the "motion range of each articulation A" and the "distance between articulations A" stored in the estimating-side identifier 11.

In FIG. 4, if the "sub subjects" Z4' ("waist"), Z5' ("right knee") and Z6' ("left knee") are linked to the "main subject" Z3', there is no unnatural thing in the "motion range of each articulation A" or the "distance between articulations A." Therefore, it is considered that the "sub subjects" Z4', Z5' and Z6' are capable of linking to the "main subject" Z3'. Hence, the "sub subjects" Z4', Z5' and Z6' are linked to the "main subject" Z3'. Thus, a plurality of articulations A (articulation groups B) belonging to each subject Z1 to Z3 is determined.

As shown in FIG. 1, since the "right knee" of the subject Z2 is hidden behind the subject Z3, the data of the "right knee" of the subject Z2 is missing. However, the specifying unit 15 provides a coordinate to the "right knee", assuming that the "right knee" is presented in the position estimated from the positions of other articulations A7 to A11, while referring to the references on "basic posture", "motion range of each articulation A" and "distance between articulations A" stored in estimating-side identifier 11. When a "right knee" is detected in a time-series image Y before or after the target time-series image Y, they are treated as a continuous action. Note that, the above described linking does not exclude the case where only one "main subject" is categorized.

Returning to FIG. 2, the estimating unit 16 estimates the action of the subject Z, while referring to the second learning unit 27, based on the displacement in the plurality of time-series images Y of the coordinate and the depth of the whole of the articulation group B specified in the specifying unit 15. Specifically, the estimating unit 16 selects one or more actions with high probability from among various action choices ("fall", "walk", "running" and "throwing", etc.), while referring to the second learning unit 27. Thus, in the action-estimating device 1, the coordinate and the depth of the whole of the articulation group B of each subject Z is inputted in a time-series inference model, in which LSTM (Long Short Term Memory) is used, and the action identifying label such as "walking" and "standing" is outputted.

Here, the action of the subject Z can be estimated from the time-series displacement of each articulation A to some extent. However, it is difficult to estimate the action with high precision only by tracking the time-series displacement of each articulation A. On the other hands, in the present embodiment, an action-estimation with high precision is realized by estimating the action of the subject Z based on the displacement in the plurality of time-series images Y of the coordinate and the depth of the whole of the articulation group B belonging to a single subject Z.

Figure 5:
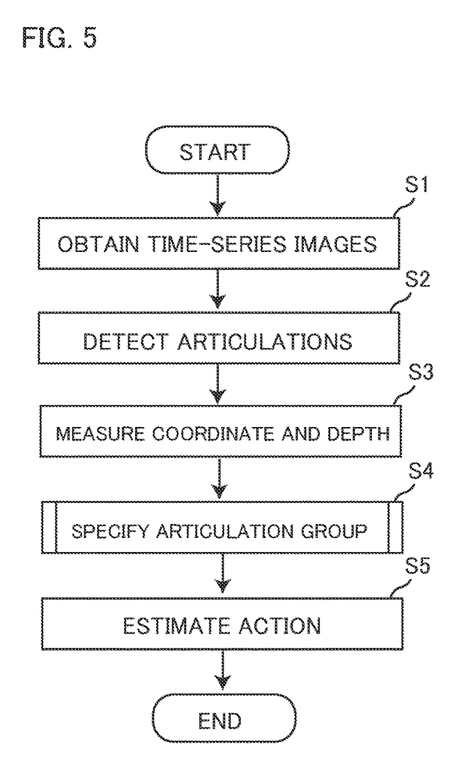
FIG. 5 is a flowchart of action-estimating in the action-estimating device according to the embodiment of the present invention.
Figure 6:
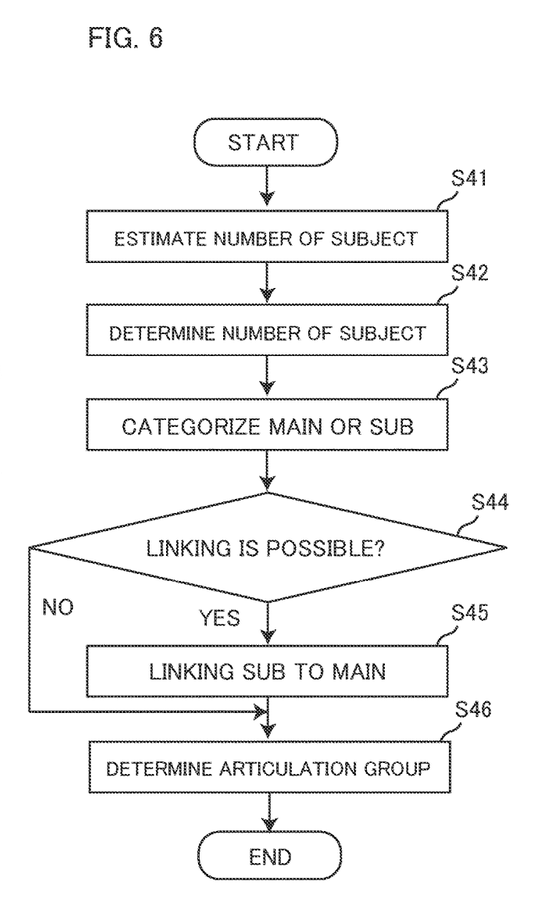
FIG. 6. is a flowchart of subject-number specifying according to the embodiment of the present invention.

Next, by using the flowcharts in FIGS. 5 and 6, "Specifying of articulation group B belonging to each subject Z" and "Estimating of action of each subject Z" according to the action-estimating device 1 are explained.

First, when the estimating-side obtaining unit 12 obtains a plurality of time-series images Y (S1), a plurality of articulations A appearing in each of the time-series images Y is detected by the estimating-side detecting unit 13 (S2).

Next, the coordinates and the depths of the plurality of articulations A detected in S2 are measured by the estimating-side measuring unit 14 (S3). This measurement is performed for each time-series image Y.

Next, the articulation group B belonging to each subject Z among the plurality of articulations A is specified by the specifying unit 15, based on the displacement in the plurality of time-series images Y of the coordinate and the depth of each articulation A measured in S3 (S4).

With regard to the "specifying of articulation group B belonging to each subject Z", as shown in the flowchart of FIG. 6, the estimating of the number of subjects Z is firstly performed based on the reference on the "basic posture" stored in the learning-side identifier 21 (S41).

In the example shown in FIG. 4, it is estimated that six subjects Z1' to Z6' ("articulations A1 to A6", "articulations A7 to A11", "articulations A12 to A14", "articulation A15", "articulation A16" and "articulation A11") are presented in the time-series image Y.

Next, the determining of the number of subjects Z is performed based on the number of articulation-kinds in the plurality of articulations A (S42).

In the example shown in FIG. 4, the articulations A of "head", "right elbow", "left elbow", "waist" and "left knee", which are respectively presented three, are the largest articulation-kinds in number. Therefore, it is determined that three subjects Z are presented in the time-series image Y.

Next, the subjects Z1' to Z6' are categorized into "main subject" or "sub subject" (S43).

In the example shown in FIG. 4, the subjects Z1', Z2', and Z3', which are top three in the number of the included articulations A, are categorized into the "main subject", while the other subjects Z4', Z5' and Z6' are categorized into the "sub subject".

Next, it is determined whether or not the "sub subject" Z4', Z5' and Z6' can be linked to any one of the "main subjects" Z1', Z2' and Z3', while referring to the reference on the "motion range of each articulation A" stored in the estimating-side identifier 11 (S44).

When it is determined to be capable of linking (S44: YES), linking is performed (S45) and the plurality of articulations A (articulation group B) belonging to each subject Z are determined (S46).

In the example shown in FIG. 4, all of the sub subjects Z4' ("waist"), Z5' ("right knee")', and Z6' ("left knee") are determined to be capable of linking to the main subject Z3', and are linked to the main subject Z3'.

Then, return to FIG. 5, finally, the action of the subject Z is estimated by the estimating unit 16, based on the displacement in the plurality of time-series images Y of the coordinate and the depth of the whole of the articulation group B specified in S4 (S5).

The action-estimating device 1 having such a configuration, for example, can be used in the below purpose; In a nursing home, the action-estimating device 1 will always photograph inside the room where care-receivers (subject Z) are there. Then, if the case for those care-receivers to fall or the like are estimated based on the photographed images, the action-estimating device 1 will give an alert on that fact to a caregiver.

Note that the above-mentioned action-estimating device 1 performs the "estimating of each subject Z" on the assumption that the learning device 2 has performed "learning action of each subject Z". Therefore, by using the flowchart of FIG. 7, "learning action of each subject Z" by the learning device 2 will be explained.

Figure 7:
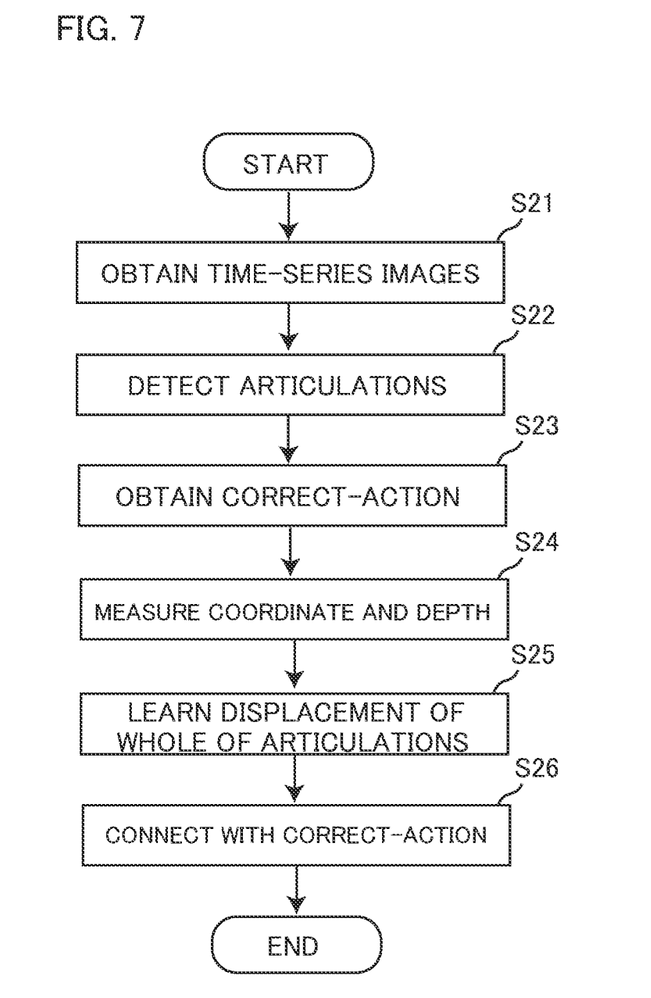
FIG. 7 is a flowchart of action-learning according to the embodiment of the present invention.

First, when the learning-side obtaining unit 22 obtains a plurality of time-series images Y (S21), a plurality of articulations A appearing in each time-series image Y is detected by the learning-side detecting unit 23 (S22).

Next, when a correct-action for each articulation A detected by the learning-side detecting unit 23 is obtained by the correct-action obtaining unit 24 (S23), the coordinates and the depth of the plurality of articulations A detected in S22 are measured (S24). This measurement is performed for each time-series image Y.

Then, the first learning unit 26 learns the displacement in the plurality of time-series images Y of the coordinate and the depth of the whole of the plurality of articulations A belonging to each subject Z (S25).

Finally, the second learning unit 27 learns the displacement in the plurality of time-series images Y of the coordinate and the depth of the whole of the articulation B, which has been learned by the first learning unit 26, in connection with the correct-action inputted in the correct-action obtaining unit 24 (S26).

As described above, in the action-estimating device 1 according to the present embodiment, the action of the subject Z is estimated based on the displacement in the plurality of time-series images Y of the coordinate and the depth of the whole of the plurality of articulations A (articulation group B).

With this configuration, the action-estimation with high degree of precision, which is not available only by tracking the time-series displacement for each articulation A individually, is realized, since the action of the subject Z is estimated based on the displacement in the plurality of time-series images Y of the coordinate and the depth of the whole of the articulation group B. In addition, the load on the CPU can be significantly reduced, since it is not necessary to consider the displacement of each articulation A. Further, it does not need to attach a sensor to the subject Z side, or provide a specific expensive sensor to the action-estimating device 1 just by preparing the action-estimating device 1, the learning device 2 and the photographing unit X. Therefore, it becomes possible to perform the action-estimating more simply and inexpensively. Further, by using the annotation technology, it becomes possible to produce a lot of training data from the same image. Therefore, it becomes possible to perform the action-estimating more inexpensively and precisely.

Further, in the action-estimating device 1 according to the present embodiment, the displacement of coordinate and the depth of the whole of the articulation group B includes the displacement of coordinate and depth of the center of gravity of the articulation group B.

With this configuration, it becomes possible to estimate the action accurately by using the displacement of the coordinate and the depth of the center of gravity closely related to the body movement.

Further, in the action-estimating device 1 according to the present embodiment, the estimating of the number of subjects Z in each time-series image Y is performed based on the reference on the "basic posture, and then, the number of subjects Z appearing in the time-series image Y is determined based on both the estimated number of subjects Z and the number of articulation-kinds in the detected plurality of articulations A.

With this configuration, it becomes possible to accurately determine the number of subjects Z appearing in the time-series image Y.

Further, in the action-estimating device 1 according to the present embodiment, in the determining of the number of subjects Z, the estimated number of subjects Z' are categorized into the "main subject" or the other "sub subject", and the "sub subject" is linked to any one of the "main subject" while referring to the references on the "motion range of plurality of articulations A" and the "distance between articulations A". The number of subjects Z' same as the determined number of subjects Z are categorized into the "main subject" in decreasing order of the number of the detected articulations A.

With this configuration, it becomes possible to more accurately determine the number of subjects Z appearing in the time-series image Y.

Further, in the learning device 2 according to the present embodiment, the displacement in the plurality of time-series image Y of the coordinate and the depth of the whole of the plurality of articulations A (articulation group B) is learned in connection with a correct-action.

With this configuration, it becomes possible to provide the action-estimating device 1 with information for performing action-estimation with high precision.

Also, in the learning device 2 according to the present embodiment, the displacement of the coordinate and the depth of the whole of the articulation group B is the displacement of the coordinate and the depth of the center of gravity of the articulation group B.

With this configuration, it becomes possible to provide the action-estimating device 1 with information for performing action-estimation with higher precision.

While the action-estimating device of the invention has been described in detail with reference to the preferred embodiment thereof, it would be apparent to those skilled in the art that many modifications and variations may be made therein without departing from the spirit of the invention, the scope of which is defined by the attached claims.

For example, in the above-described embodiment, in the estimating of the action of the subject Z, the displacement in the plurality of time-series images Y of the coordinate and depth of the articulation group B is taken into account. However, the displacement in the plurality of time-series images Y of each articulation A may additionally be taken into account.

Further, in the above embodiment, the depth is expressed as Z (t). However, the depth is not necessarily expressed in coordinate, and it may be expressed by relative depth in the plurality of time-series images Y.

Further, in the above embodiment, the action of the subject Z in the plurality of time-series images Y is estimated. However, it may also be possible to predict the action which will occur after the plurality of time-series images Y. For example, a falling action of a subject Z is learned by learning device 2 in advance. If the plurality of time-series images Y indicates the first half of the falling action of the subject Z, the action-estimating device can predict that the subject Z will fall after the plurality of time-series images Y. Therefore, if the subject Z wears a falling-prevention mechanism, it becomes possible to give a momentary instruction of falling-prevention operation to the mechanism.

Further, in the above embodiment, in the determining of numbers of subject Z, the number of subjects Z' same as the determined number of subjects Z (three) are categorized into the "main subject" in decreasing order of the number of the detected articulation A. However, the following method may also be considered; wherein the subject Z' including the articulation A, which has been determined to be "basic posture" or part of "basic posture", is categorized into the "main subject".

Further, in the above embodiment, a human is explained as an example of the subject Z. However, it is also possible to estimate an animal's action or robot's action. In addition, in the above embodiment, the neck, right elbow, left elbow, waist, right knee, and left knee are used as a plurality of articulations A. However, it is needless to say that the other articulations and more of articulations A may also be employed.

The present invention is also applied to a program that conducts the process of the action-estimating device 1 and the learning device 2, or to a record media accommodating the content of the program. In the case of record media, the program should be installed on the computer or the like. The record media storing the program may be reusable and not one-time use only. As reusable record media, for example, CD-ROM may be employed, but the record media is not limited to this.

DESCRIPTION OF THE REFERENCE NUMBER

1 Action-estimating device
2 Learning device
21 Learning-side identifier
22 Learning-side obtaining unit
23 Learning-side detecting unit
24 Correct-action obtaining unit
25 Learning-side measuring unit
26 First learning unit
27 Second learning unit
11 Estimating-side identifier
12 Estimating-side obtaining unit
13 Estimating-side detecting unit
14 Estimating-side measuring unit
15 Specifying unit
16 Estimating unit
A Articulation
B Articulation group
X Photographing means
Y Time-series images
Z Subject

The invention claimed is:

1. An action-estimating device comprising:
a storing unit configured to store a reference for identifying a plurality of articulations of a subject; and
a controller configured to obtain a plurality of time-series images in which one or more subjects appear; detect a plurality of articulations appearing in each time-series image based on the reference for identifying a plurality of articulations; measure coordinates and depths of the plurality of articulations appearing in each time-series image; specify an articulation group belonging to one subject among the plurality of articulations, based on displacement in the plurality of time-series images of the coordinate and the depth of each measured articulation; and estimate an action of the one subject based on the displacement in the plurality of time-series images of the coordinate and the depth of the whole of the articulation group, referring to learned displacements in a plurality of time-series images of coordinates and the depths of the whole of a plurality of articulations belonging to each of a plurality of subjects.

2. The action-estimating device according to claim 1, wherein the displacement of the coordinate and the depth of the whole of the articulation group includes displacement of the coordinate and the depth of a center of gravity of the articulation group.

3. The action-estimating device according to claim 1, wherein the controller is configured to predict an action of the one subject which follows the plurality of time-series images, based on the displacement of the coordinate and the depth of the whole of the articulation group.

4. The action-estimating device according to claim 1, wherein the storing unit further stores reference on a basic posture of a subject, and
wherein the controller estimates the number of subjects appearing in the time-series images, based on the reference of a basic posture, and determines the number of subjects appearing in the time-series images, based on both the estimated number of subjects and the number of articulation-kinds in the detected plurality of articulations.

5. The action-estimating device according to claim 4, wherein the storing unit further stores reference on motion ranges of a plurality of articulations and reference on a distance between articulations in a subject,
wherein, when determining the number of subjects, the controller categorizes the estimated number of subjects into a main subject or a sub subject other than the main subject, and links the sub subject to any one of the main subjects, based on the reference on motion ranges of a plurality of articulations and the reference on a distance between articulations, and
wherein, when categorizing, the controller categorizes the number of subjects same as the determined number of subjects into the main subject in decreasing order of the number of the detected articulations or categorizes a subject which fall under the reference on a basic posture to the main posture.

6. A computer readable medium storing on a non-transitory, non-volatile memory instructions executable by a computer and a reference for identifying a plurality of articulations of a subject, comprising:
a step for obtaining a plurality of time-series images in which one or more subjects appear;
a step for detecting a plurality of articulations appearing in each time-series image based on the reference for identifying a plurality of articulations;
a step for measuring coordinates and depths of the plurality of articulations appearing in each time-series image;
a step for specifying an articulation group belonging to one subject among the plurality of articulations, based on displacement in the plurality of time-series images of the coordinate and the depth of each measured articulation; and
a step for estimating an action of the one subject based on the displacement in the plurality of time-series images of the coordinate and the depth of the whole of the articulation group, referring to learned displacements in a plurality of time-series images of coordinates and the depths of the whole of a plurality of articulations belonging to each of a plurality of subjects.

7. The computer readable medium according to claim 6, wherein the displacement of the coordinate and the depth of the whole of the articulation group includes displacement of the coordinate and the depth of a center of gravity of the articulation group.

8. The computer readable medium according to claim 6, further comprising a step for predicting an action of the one subject which follows the plurality of time-series images, based on the displacement of the coordinate and the depth of the whole of the articulation group.

9. The computer readable medium according to claim 6, wherein the computer further stores reference on a basic posture of a subject, and
wherein the specifying step estimates the number of subjects appearing in the time-series images, based on the reference of a basic posture, and determines the number of subjects appearing in the time-series images, based on both the estimated number of subjects and the number of articulation-kinds in the detected plurality of articulations.

10. The computer readable medium according to claim 9, wherein the computer further stores reference on motion ranges of a plurality of articulations and reference on a distance between articulations in a subject,
wherein, when determining the number of subjects, the specifying step categorizes the estimated number of subjects into a main subject or a sub subject other than the main subject, and links the sub subject to any one of the main subjects, based on the reference on motion ranges of a plurality of articulations and the reference on a distance between articulations, and
wherein, when categorizing, the specifying step categorizes the number of subjects same as the determined number of subjects into the main subject in decreasing order of the number of the detected articulations or categorizes a subject which fall under the reference on a basic posture to the main posture.

* * * * *